United States Patent
Gilson et al.

(10) Patent No.: US 11,671,909 B2
(45) Date of Patent: Jun. 6, 2023

(54) METHODS AND SYSTEMS FOR SELECTION OF OPTIMAL ACCESS POINTS

(71) Applicant: Comcast Cable Communications, LLC, Philadelphia, PA (US)

(72) Inventors: Ross Gilson, Philadelphia, PA (US); Alex Cook, Lawrenceville, GA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/322,417

(22) Filed: May 17, 2021

(65) Prior Publication Data

US 2021/0274437 A1 Sep. 2, 2021

Related U.S. Application Data

(63) Continuation of application No. 15/876,716, filed on Jan. 22, 2018, now Pat. No. 11,039,387.

(51) Int. Cl.
*H04W 48/00* (2009.01)
*H04W 48/20* (2009.01)
*H04W 36/32* (2009.01)
*H04W 36/30* (2009.01)
*H04W 24/02* (2009.01)

(52) U.S. Cl.
CPC ........... *H04W 48/20* (2013.01); *H04W 24/02* (2013.01); *H04W 36/30* (2013.01); *H04W 36/32* (2013.01)

(58) Field of Classification Search
None
See application file for complete search history.

(56) References Cited

U.S. PATENT DOCUMENTS

| | | | |
|---|---|---|---|
| 8,326,293 B2 | 12/2012 | Reinhold et al. |
| 8,385,216 B1 | 2/2013 | Shetty et al. |
| 8,391,907 B1 | 3/2013 | Cocos |
| 8,473,006 B1 | 6/2013 | Halferty et al. |
| 8,630,255 B1 | 1/2014 | Kunz et al. |
| 9,019,984 B2 | 4/2015 | Grosman et al. |
| 9,026,099 B2 | 5/2015 | Chhabra et al. |
| 2010/0248640 A1 | 9/2010 | MacNaughtan et al. |
| 2011/0110251 A1 | 5/2011 | Krishnamurthy et al. |
| 2012/0094702 A1 | 4/2012 | Furueda et al. |
| 2012/0315905 A1 | 12/2012 | Zhu et al. |

(Continued)

FOREIGN PATENT DOCUMENTS

WO    WO-2011139855 A1 * 11/2011    ............ H04W 24/10

OTHER PUBLICATIONS

WLAN Antennas, webpage capture from Apr. 14, 2015, https://web.archive.org/web/20150414135526/http://www.wlanantennas.com/faq.php.

*Primary Examiner* — Gerald A Smarth
(74) *Attorney, Agent, or Firm* — BakerHostetler

(57) ABSTRACT

Systems, methods, and devices are described for establishing communication with an access point. A wireless device may determine to switch to another access point radio based on a variety of factors. The wireless device may use a dynamic threshold to determine whether to switch to another access point radio. The dynamic threshold may be based on a current state of the wireless device. The wireless device may determine other access point radios to switch to directly or indirectly. An access point radio may broadcast information associated with the access point as well as information associated with other access point radios.

21 Claims, 7 Drawing Sheets

(56) References Cited

U.S. PATENT DOCUMENTS

| | | |
|---|---|---|
| 2013/0065632 A1* | 3/2013 | Macias .......... H04W 36/00837 |
| | | 455/525 |
| 2013/0072259 A1 | 3/2013 | Kusano et al. |
| 2013/0078993 A1 | 3/2013 | Okino et al. |
| 2013/0150012 A1* | 6/2013 | Chhabra ............... H04W 48/16 |
| | | 455/418 |
| 2016/0088536 A1 | 3/2016 | Zingler et al. |
| 2016/0088570 A1 | 3/2016 | Cui et al. |
| 2016/0149302 A1 | 5/2016 | Sanderovich et al. |
| 2016/0373984 A1 | 12/2016 | Hara |
| 2016/0381617 A1 | 12/2016 | Sirotkin et al. |
| 2017/0013539 A1 | 1/2017 | Lepp et al. |

* cited by examiner

METHODS AND SYSTEMS FOR SELECTION OF OPTIMAL ACCESS POINTS

CROSS REFERENCE TO RELATED APPLICATIONS

This application is a continuation of U.S. patent application Ser. No. 15/876,716, filed on Jan. 22, 2018, which is hereby incorporated by reference in its entirety for any and all purposes.

BACKGROUND

Wireless devices allow users to access services from a variety of locations. As a user moves from one location to another, a wireless device may need to connect to another access point. Locating additional access points and disconnecting from one access point to connect to another access point may cause disruptions of service.

SUMMARY

Systems and methods are described for accessing a wireless network. As a user moves from one wireless coverage area to another, a wireless device of the user may transition from one network to another. A first access point and/or a second access point may comprise multiple wireless radios, such as a first access point (AP) radio (e.g., 5 GHz radio) and a second AP radio (e.g., 2.4 GHz radio). The wireless device may communicate with, via a first client radio of the wireless device, the first AP radio of the first access point. The wireless device may detect network information (e.g., signal strength, service identifiers, beacons, network parameters) via a second client radio of the wireless device. The network information may be received in a message and/or determined based on monitoring conditions. Wireless data (e.g., signals, beacons) received, by the second client radio, may be analyzed to determine an optimal radio of an access point to connect with to access a network. The optimal radio to connect with may be determined based on a dynamic threshold. A value of the threshold may vary based on current conditions of the wireless device.

The wireless device may switch to using the second client radio as a primary radio (e.g., temporarily, until a condition is met) and/or use the second client radio to establish a redundant connection. A redundant connection may be used to continue network access if the first client radio is switching from one access point to another. The wireless device may also control timing for disconnecting from the first access point. For example, the wireless device may send a disconnect message for the first client radio in response to completing a network provisioning sequence (e.g., receiving an internet protocol address) for the second client radio.

This summary introduces a selection of concepts in a simplified form that are described in the detailed description. This summary is not intended to identify key features or essential features of the claimed subject matter, nor is it intended to be used to limit the scope of the claimed subject matter. The claimed subject matter is not limited to limitations that solve any or all disadvantages noted in any part of this disclosure.

BRIEF DESCRIPTION OF THE FIGURES

The following detailed description is better understood when read in conjunction with the appended drawings. For the purposes of illustration, examples are shown in the drawings. However, the subject matter is not limited to the specific elements and instrumentalities disclosed.

DETAILED DESCRIPTION

Figure 1:
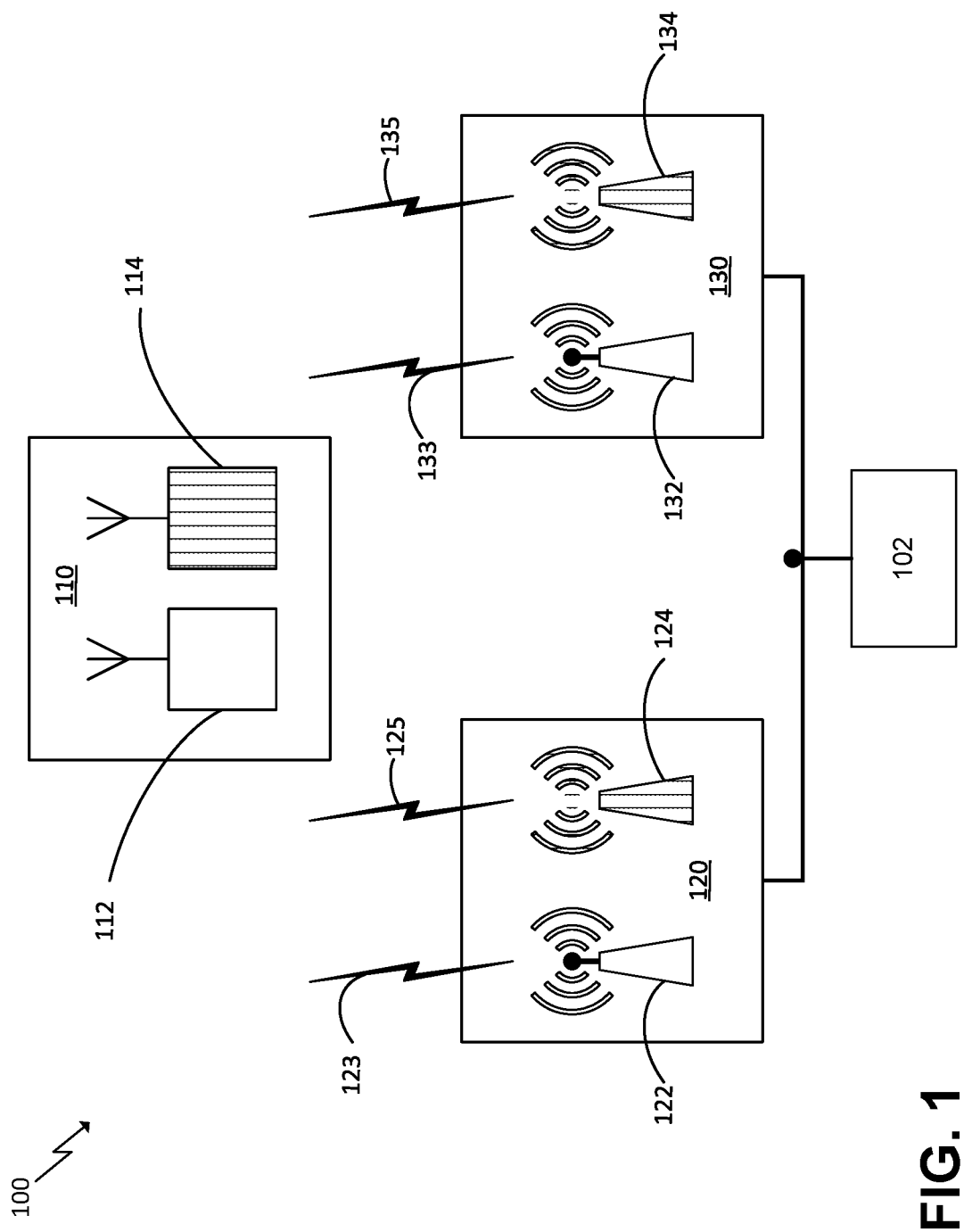
FIG. 1 is a block diagram of an example network.

Computing devices, such as user devices, wireless devices, mobile devices, and the like, may experience a number of challenges related to changing from one wireless network access point (AP) to another. For example, wireless devices often fail to determine to optimal timing for switching from one AP to another AP. This failure may cause poor network performance at the edge of connectivity of a first AP even though a second AP is accessible by the wireless device. A first radio, which is typically used for network access, may be intermittently used for network scanning between accessing the network, resulting in temporary disconnection from a network.

If a wireless device determines that a second AP may offer a better network connection than currently available at a first AP, then the wireless device may send a de-authorization packet to the first AP to terminate the connection. The wireless device may attempt to associate with the second AP in response to sending a de-authorization packet to the primary AP. This approach results in a delay that may disrupt service because upper layer protocols, such as like DHCP, may be restarted (e.g., which may take seconds) before data transmission can be restarted.

The present methods and systems leverage the use of multiple radios to prevent the delays in service described above. Many wireless devices have two or more radios, such as a 900 MHz radio, a 2.4 GHz radio, a 5 GHz radio, and a 60 GHz radio. Despite having multiple radios, many devices often only utilize one radio at a time. An additional radio may be used to detect changing network conditions. Network conditions may change as wireless device moves in an out of coverage areas. Different radios, even of the same access point, may have different coverage areas due to different levels of propagation, the presence of interference, and/or the like. The present methods and systems allow for a first radio to be used for a data connection and a second radio to be used to determine changes in the coverage information.

The transition of disconnecting from one AP and connecting to another AP is improved as described herein. A wireless device may determine to switch between two AP's. The wireless device may send a de-authorization packet to the currently connected AP. The wireless device may associate with the new AP. Upper layer protocols, such as DHCP, may be renegotiated. The lower layer re-association may take less than 100 ms, but upper layer protocols may take a few seconds before packets transmission restarts. This approach may result in interruption of service, which may affect user experience. Even a 100 ms downtime may noticeably affect a protocol such as Voice over Internet-Protocol (VoIP). This transition can be improved by establishing a connection with another AP before sending the de-authorization packet to the currently connected AP.

Systems, methods, and apparatuses are described in which a number of techniques may be employed, alone or in combination, to address these issues. Wireless access points may use multiple radios, such as a first AP radio and a second AP radio. The first AP radio may broadcast data (e.g., a signal, a message, a beacon). The data may comprise information about the first AP radio and/or the second AP radio available on the access point. Wireless devices may use multiple radios, such as a first radio and a second radio. The first radio may be used for communications to support user applications. The second radio may actively and/or passively obtain network information about one or more access points within range. The first radio and the second radio may switch roles. For example, the second radio may be used for communications to support user applications. The first radio may actively and/or passively obtain network information about one or more access points within range. The network information may be used to determine a condition for establishing a logical or physical connection to another AP (e.g., or another radio of an access point).

The second radio may monitor (e.g., receive, listen) for data (e.g., or signals, messages, beacons) sent by an access point. The network information may comprise information received in the data. The network information may comprise measurements of signals (e.g., that send the data). The network information may comprise availability of a logical or physical connection of an access point. The network information may be obtained by querying access points. For example, the wireless device may probe for information actively by sending a query to one or more access points (e.g., all access points in range). The query (e.g., probe) may be sent at a variety of frequencies (e.g., 2.4 GHz, 5 GHz). The query (e.g., probe) may be sent at a variety of bit rates (e.g., to determine available connection rates). The query may be directed to one or more specific access points, broadcast generally, broadcast to classes of devices, and/or the like. The wireless device may use a low bandwidth channel to send a query to an access point not yet connected to the wireless device. In the query, the wireless device may request information about services available from that access point. A response to the query may be received that comprises information about a network (e.g., service set identifier), frequency range, a band, a protocol, expected network performance at different ranges of connections available at the queried access point, and/or the like. An access point may also send information about other access points for which the queried access point has information.

For example, a first wireless access point may comprise a first AP radio and a second AP radio. The second AP radio may send (e.g., transmit, broadcast) data (e.g., a beacon, signal, message) comprising information associated with the first AP radio. A wireless device may comprise a third radio and a fourth radio. The wireless device may communicate with a second access point via the third radio, while scanning for access points using the fourth radio. The scan may detect the data sent by the first access point. The wireless device may determine, from the data, the information associated with the first radio of the first access point. This information may comprise, for example, the location of the first access point, the frequencies, bands, channels, bandwidth, and/or the like available for use. The wireless device may use the information to determine to connect to the first AP radio. The wireless device may switch to the first access point as the location of the wireless device changes.

FIG. 1 shows an example system 100 that may comprise a network device 102. The network device 102 may comprise a hub, a router, a switch, and/or the like. The network device 102 may be in communication with a first access point 120, a second access point 130, a wireless device 110, a combination thereof, and/or the like. The network device 102 may comprise, or be in communication with, a gateway, a modem, a router, a switch, and/or the like. The network device 102 may be connected to a local or wide area network. The network device 102 may be configured to send data to a remote service, such as a web server, application server, content delivery device, and/or the like. The network device 102 may be connected to a content delivery network, a content access network, and/or the like. The network device may be connected to a packet switched network (e.g., DOCSIS based network), or non-packet switched network (e.g., cable delivery network, quadrature amplitude modulated network).

The wireless device 110 may comprise multiple wireless radios, such as a first radio 112 and a second radio 114. A wireless radio may comprise a transmitter, receiver, transceiver, antenna, and/or the like. The first radio 112 may operate in a first band (e.g., a first frequency range, a first logical channel). The second radio 114 may operate in a second band (e.g., a second frequency range, a second logical channel). The wireless device 110 may comprise a user device, a mobile device, a smart phone, a tablet, a laptop, a gaming device, a navigation system, an onboard media system, a smart device (e.g., a smart phone, smart apparel, a smart watch, smart glasses), a combination thereof, and/or the like. In FIG. 1, the first radio 112 and second radio 114 are shown as having separate antennas. The first radio 112 and the second radio 114 may have separate hardware and antennas, or have one or more components in common. The first band may be a wireless band, such as a Wi-Fi® band (e.g., 900 MHz, 2.4 GHz, 5 GHz, or 60 GHz), Bluetooth® band, an infrared band, a ZigBee® band, and/or the like. The second band may be a wireless band separate from the first band. Alternatively, the first radio 112 and the second radio 114 may operate in the same wireless band simultaneously, e.g., on separate channels.

The first access point 120 may comprise a wireless access point. The first access point 120 may comprise a router, a gateway, and/or the like. The second access point 130 may comprise a wireless access point. The second access point 130 may comprise a wireless extender configured to extend a wireless service of the first access point 120. The second access point 130 may amplify, rebroadcast, receive, transmit and/or the like signals of the first access point 120. The second access point 130 may be configured with a same service set identifier as the first access point 120.

The first access point 120 may comprise one or more radios, such as a first AP radio 122 and a second AP radio 124. The first AP radio 122 may operate in the first band. The second AP radio 124 may operate in the second band. The second access point 130 may comprise one or more radios, such as a third AP radio 132 and a fourth AP radio 134. The third AP radio 132 may operate in the first band. The fourth AP radio 134 may operate in the second band.

The first access point 120 may be configured to send (e.g., transmit, broadcast) data, such as messages, beacons, and/or the like. The data may comprise network information, such as a network identifier, supported transmission rates, network parameters, timing information (e.g., beacon interval). The first AP radio 122 may send first data 123 (e.g., first communication data). The second AP radio 124 may send second data 125. The second access point 130 may be configured to send (e.g., broadcast) data, such as messages, beacons, and/or the like. The third AP radio 132 may send third data 133. The fourth AP radio 134 may send fourth data 135. The first data 123, the second data 125, the third data 133, and/or the fourth data 135 may comprise information regarding their respective access point and other access points in the system. For example, the first data 123 of the first AP radio 122 may comprise information indicating a presence of the second AP radio 124. The first data 123 may indicate that the second AP radio 124 and the first AP radio 122 are both comprised in the first access point 120. The first data 123 may indicate that the first AP radio 122 operates in the first band. The first data 123 may indicate that the second AP radio 124 operates in the second band. Similarly, the first data 123 may comprise information (e.g., an identifier) indicating the presence of the second access point 130, the third AP radio 132, and/or the fourth AP radio 134. The first data 123 may comprise a physical location (e.g., distance, a GPS coordinate, a longitude, a latitude, a building identifier, a room identifier, a region identifier), the bands in which the access points and/or radios operate, and other operational parameters.

The wireless device 110 may communicate, via the first radio 112, with the first access point 120 while using the second radio 114 to detect (e.g., actively or passively) other access points. Different scenarios present different challenges for detecting an access point. If, for example, the wireless device 110 is located where signals from the first access point 120 and the second access point 130 overlap, and both signals are on the same channel in the same band, then the wireless device 110 may only use the first radio 112 to listen to both signals. In another scenario, the second access point 130 may operate on a different channel than the first access point 120 (e.g., even if the first access point 120 and the second access point 130 operate in the same band). The wireless device 110 may operate the second radio 114 to detect communication from the second access point 130 (e.g., while operating the first radio 112 to communicate with the first access point 120).

The first radio 112 of the wireless device 110 may operate in the first band. The second radio 114 may operate in the second band. The first band may comprise a lower frequency band (e.g., 2.4 GHz) than a frequency band (e.g., 5 GHz) of the second band. Information sent at the lower frequency band may travel a greater distance than information sent at a higher frequency band. Depending on a location of the wireless device, the wireless device 110 may receive information sent in the first band but may be out of range of signals in the second band. The wireless device 110 may receive information about the second AP radio 124 while only receiving information (e.g., via the first data 123) from the first AP radio 122. For example, though the wireless device is located outside a coverage area of the second band, the wireless device may receive information about the second AP radio 124 via data sent in the first band via the first AP radio 122.

The wireless device 110 may use data (e.g., a message, a beacon) received from an access point, measurements associated with the data (e.g., measurements of signals sending the data), and other information in a variety of ways, e.g.: in mapping locations and probable ranges of various access point signals and beams, anticipating optimal occasions to switch access points even before any physical connection is established, associating a second radio with a new access point before disconnecting a first radio from an another access point, and/or the like. Through such use of information, the time used to switch between access points may be greatly reduced. Fast BSS transition (e.g., or fast roaming), implemented via IEEE 802.11r, for example, may be used to decrease the time for switching between access points by reducing the time needed for security and quality of service association. Determining information regarding access point locations and characteristics (e.g., as obtained via beacons and queries) may decrease the time for switching between access points.

In the examples described herein in reference to the figures, devices such as wireless device 110 are described as moving in relation to access points that are relatively fixed in position. However, it will be appreciated that the techniques described herein apply equally to situations where one or more an access points are in motion relative to other wireless devices. For example, an access point may be physically moved in order to scan an environment for user devices or sensors placed at fixed locations. As access points power on and off, network coverage and conditions may also vary over time. The first access point 120 and the second access point 130 are both shown as being wired to the network device 102. It should be understood that any of the devices in the system may be in communication via wireless links, wired links, and/or a combination thereof.

Figure 2:
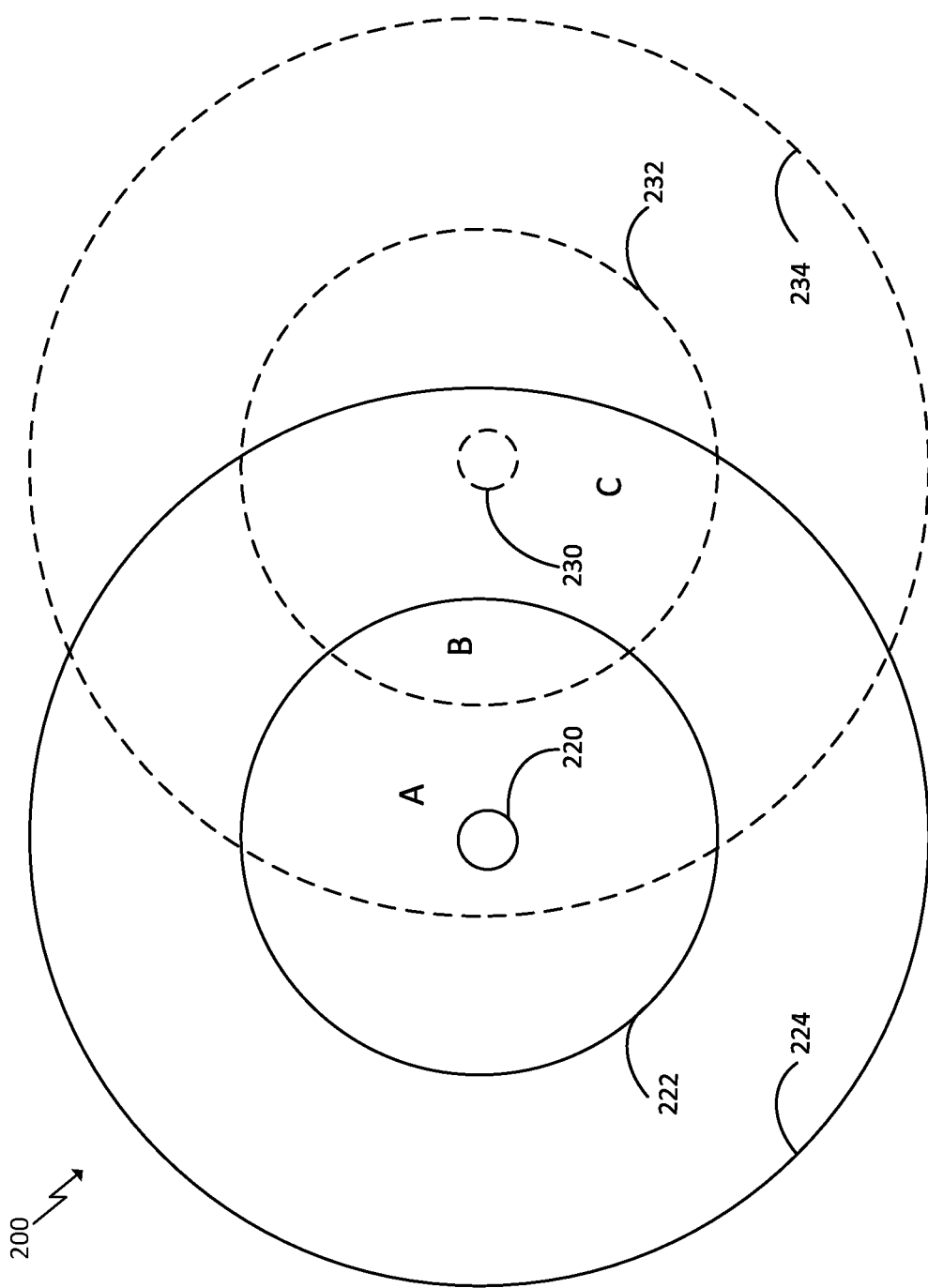
FIG. 2 is a diagram of example network coverage.

FIG. 2 shows an example scenario 200 in which two access points (APs), a first AP 220 and a second AP 230 are located a first distance (e.g., an overlapping coverage distance) from each other. Each AP may comprise two radios: a 2.4 GHz radio and a 5 GHz radio. The two radios may comprise omni-directional radios. It should be understood that the 2.4 GHz and 5 GHz frequency ranges assigned to these radios are only for purposes of illustration. It is contemplated that the radios of each AP may be configured according to any appropriate frequency, frequency range, channel, and/or transmission protocol. The two radios may have different ranges of coverage as shown via circular lines. The larger circular areas defined by the circular lines include any smaller area shown by circular lines that is contained within the larger circular area.

The range of the first AP 220 is shown using solid lines, while the range of the second AP is shown using dashed lines. The range of the 5 GHz radio of the first AP 220 may reach (e.g., span, extend to, be limited to) a first coverage area 222. The range of the 2.4 GHz radio may reach to a second coverage area 224. Similarly, the range of the 5 GHz radio of the second AP 230 may reach a third coverage area 232. The range of the 2.4 GHz radio of the second AP 230 may reach a fourth coverage area 234. A wireless device at position A may be in communication with (e.g., connect to) either of the radios of the first AP 220 or the 2.4 GHz radio of the second AP 230. At position B, the wireless device may be in communication with any of the radios of the first AP 220 and the second AP 230. At position C, the wireless device may be in communication with the 2.4 GHz radio of the second AP 230, the 5 GHz radio of the second AP 230, and/or the 2.4 GHz radio of the first AP 220.

A wireless device may be configured to prioritize establishing communication with a 5 GHz radio (e.g., or the radio with the highest transmission rate when such is available) over establishing communication with a 2.4 GHz radio. When at position A, a wireless device that has both a 5 GHz and a 2.4 GHz radio may operate the 5 GHz radio to communicate with the 5 GHz radio of the first AP 220. The wireless device at position A may operate the 2.4 GHz radio to scan for (e.g., monitor for, receive signals, transmit probes) alternative radio access points (e.g., while also operating the 5 GHz radio to communicate with the first AP 220). In the scenario shown in FIG. 2, the scan may reveal the 2.4 GHz radios of both the first AP 220 and the second AP 230. The wireless device may perform measurements of data (e.g., beacons, messages, or other signals) and/or extract information in the data. Such information may comprise data associated with a service accessible via the 2.4 GHz radios and/or the 5 GHz radios.

By measuring data (e.g., signal strength) sent via the 2.4 GHz radio of the first AP 220, the wireless device at position A may determine (e.g., estimate) that the wireless device is within range of the 5 GHz radio of the first AP 220. If the wireless device is not already in communication with the 5 GHz radio, the wireless device may determine to connect to the 5 GHz radio (e.g., or at least determine such connection is available). Similarly, by measuring the data sent via the 2.4 GHz radio of the second AP 230, the wireless device at position A may determine that the wireless device is not within the probable range of the 5 GHz radio of the second AP 230.

As the wireless device moves from position A to position B, the wireless device may reassess which connection is optimal for the wireless device. From data received (e.g., in a beacon), the wireless device may determine that the 5 GHz service available on the second AP 230. From measurement of the strength of data sent via the 2.4 GHz radio of the second AP 230, the wireless device may determine that the wireless device is within range to communicate with (e.g., connect to) the 5 GHz radio of second AP the 230. At position B, the wireless device may determine to communicate with one or more of four different radios: the 2.4 GHz radio of the first AP 220, the 5 GHz radio of the first AP 220, the 2.4 GHz radio of the second AP 230, and the 5 GHz radio of the second AP 230.

The wireless device may determine an access point and/or radio of an access point to communicate with based on additional information, such as location information, vector information, user information, and/or the like. For example, the wireless device may determine, from data received from an access point, where the access point is located (e.g., an estimated distance from the wireless device). The vector information may comprise one or more vectors representing motion (e.g., direction, velocity, acceleration) of the wireless device. The vector information may be determined based on internal sensor of the wireless device, such as a GPS sensor, an accelerometer, a gyroscopic, and/or the like. The vector information may be determined based on triangulation of AP signals (e.g., beacons), tracking (e.g., analyzing, comparing) changes in received signal levels, and/or the like. The wireless device may determine whether it is moving toward or away from an AP, the rate of movement toward or away from the AP, and/or the like. The user information may comprise user preferences (e.g., preference for a 5 GHz over a 2.4 GHz connection and vice versa), user settings, user history (e.g., history of movement, history of usage of the wireless device), and/or the like.

As shown in FIG. 2, a wireless device that has moved from position A to position B may determine (e.g., predict, infer) that the wireless device will continue heading along a vector (e.g., trajectory) toward position C. The wireless device may determine that communication will fail (e.g., deteriorate) with the 5 GHz radio of the first AP 220 as the wireless device moves toward (e.g., or arrives at, moves beyond) position B. If the wireless device arrives at position B, the wireless device may end communication with the 5 GHz radio of the first AP 220 and begin communication with the 5 GHz radio of the second AP 230.

The wireless device may connect the 2.4 GHz radio to the second AP 230 before disconnecting the 5 GHz radio from the first AP 220. The wireless device may operate the 2.4 GHz radio to obtain a network address (e.g., internet protocol address) from the 2.4 GHz radio of the second AP 230. The network address may be obtained before the wireless device disconnects from the first AP 220. The network address may be obtained while the wireless device has a network address from first AP 220. The wireless device may also use protocols, such as IEEE 802.11r, to negotiate communication with the second AP 230 (e.g., before ending a connection with a current access point). If both connections are fully operational, the wireless device may switch from using the 5 GHz radio to using the 2.4 GHz radio to send data. The wireless device may send a de-authorization to the first AP 220, via the 5 GHz radio, to end communication (e.g., or otherwise disassociate or disconnect) with the 5 GHz radio of the first AP 220. If the wireless device is communicating, via the 5 GHz radio of the first AP 220, with a service (e.g., a remote service, a web service, application service, a content service), then the wireless device may continue communicating with the service via the 2.4 GHz radio of the second AP 230.

The wireless device may move to position C. The wireless device may monitor for data (e.g., beacons) from the 5 GHz radio of the second AP 230. The wireless device may determine to operate the 5 GHz radio to communicate with (e.g., connect to) the 5 GHz radio of the second AP 230. The wireless device may also use protocols, such as IEEE 802.11r, to negotiate communication with a different radio of the second AP 230 (e.g., before ending a connection with a current radio off the second AP 230). The wireless device may end communication with (e.g., or disconnect from) the 2.4 GHz radio of the second AP 230. The wireless device may resume scanning using the 2.4 GHz radio of the wireless device. The wireless device may continue to use the 2.4 GHz radio to receive data (e.g., beacons) from the 2.4 GHz radios of the first AP 220 and the second AP 230.

Figure 3:
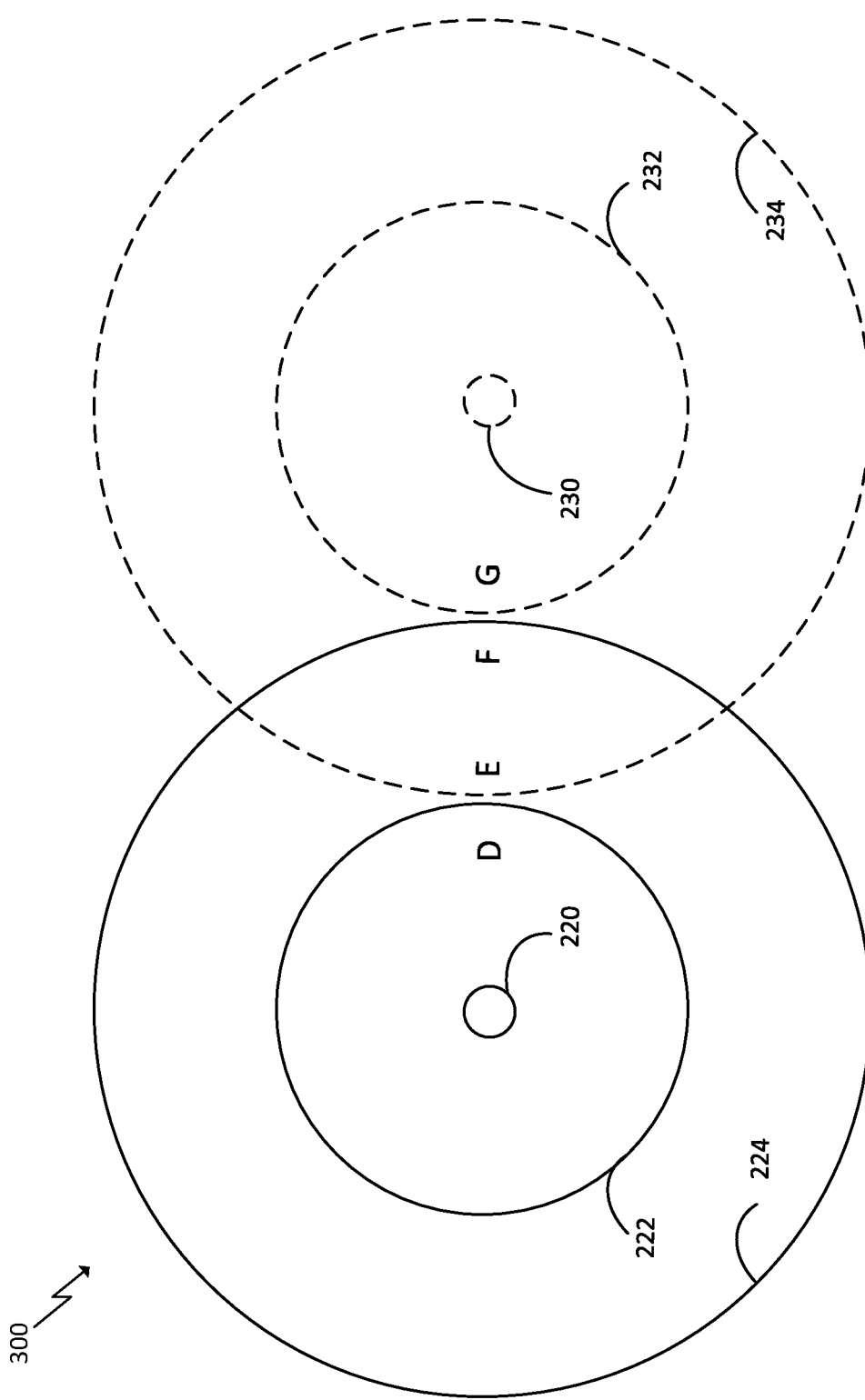
FIG. 3 is a diagram of another example of network coverage.

FIG. 3 shows an example network coverage. The network coverage may be similar to the network coverage in FIG. 2. The first AP 220 and second AP 230 may be spaced a greater distance apart than shown in FIG. 2. In this scenario, there is no longer any overlap in the network coverage (e.g., range) of the 5 GHz radio of the first AP 220 and the 5 GHz radio of the second AP 230. The range of the 5 GHz radio of the first AP 220 may reach as far as the first coverage area 222. The range of the 2.4 GHz radio of the first AP 220 may reach to the second coverage area 224. Similarly, the range of the 5 GHz radio of the second AP 230 may reach as far as the third coverage area 232. The range of the 2.4 GHz radio of the second AP 230 may reach as far as the fourth coverage area 234.

A wireless device located at position D may communicate with (e.g., connect to) the 2.4 GHz radio and/or the 5 GHz radio of the first AP 220. The wireless device may be unable communicate with the 2.4 GHz radio and/or the 5 GHz radio of the second AP 230. As the wireless device moves from position D to position E, the wireless device may no longer be able to communicate with the 5 GHz radio of the first AP 220. The wireless device may operate the 5 GHz radio of the wireless device to scan (e.g., monitor, probe, receive) for signals and/or access points. The wireless device may determine to communicate with the 2.4 GHz radio of the first AP 220 and/or the 2.4 GHz radio of the second AP 230. The wireless device may determine (e.g., prioritize) to connect to the radio with the stronger signal, such as the 2.4 GHz radio of the first AP 220 (e.g., to achieve a higher quality of service/net bandwidth). The wireless device may determine, based on vector information (e.g., trajectory) of the wireless device, to connect to the 2.4 GHz radio of second AP 230. For example, the wireless device may determine that the wireless device is moving along a trajectory from the position D to positions E, F, G, and/or a combination thereof. The wireless device may determine that the wireless device will be outside of the second coverage area 224 within a threshold time period.

The wireless device may determine whether to switch to using another radio, access point, and/or network based on one or more adaptive criteria (e.g., thresholds, factors). The adaptive criteria may comprise one or more hysteresis criteria to avoid switching too frequently. The one or more hysteresis criteria may indicate a minimum time threshold for switching between communicating with access points and/or radios of access points.

The wireless device may determine to switch to a different radio and/or access point based one or more bandwidth thresholds. The one or more bandwidth thresholds may comprise a minimum bandwidth threshold. The minimum bandwidth threshold may be adaptive (e.g., change over time based on changing conditions) based on a minimum bandwidth condition of a service (e.g., application, content delivery service, audio/video communication service). For example, if the wireless device is currently connected at 400+ Mbps, and requires 200 Mbps to satisfy the minimum bandwidth condition (e.g., desired quality) of service, the wireless device may determine not to switch to a different connection at 600 Mbps. However if the wireless device is currently connected at 100 Mbps, the wireless device may determine to connect to a different radio of an access point if the bandwidth is above the minimum bandwidth threshold. The one or more bandwidth thresholds may comprise a bandwidth change threshold indicating a minimum change in bandwidth for changing from one radio and/or access point to another. The wireless device may determine to connect to a different radio of an access point if the bandwidth would be significantly higher, e.g., 200 Mbps higher than the current value. For example, the wireless device may always switch, when possible, to achieve at least a 300 Mbps connection, or always switch when a new connection is available which improves bandwidth for the user by 200 Mbps or more.

Different adaptive criteria may be applied if different conditions are present. For example, if the wireless device moves to within a threshold of the edge of a coverage area (e.g., or the signal strength decreases below a threshold), the wireless device may change (e.g., lower) the minimum bandwidth threshold and/or bandwidth change threshold. For example, if the wireless device is connected at 20 Mbps, the wireless device may determine to connect to any other network configured to communicate at 50 Mbps or higher, for example, rather than waiting for a minimum of 300 Mbps or an improvement of at least 200 Mbps.

The adaptive criteria may be based on packet loss. If a packet loss threshold is reached, the wireless device may determine to switch to another, more reliable connection. Similarly, packet loss may be a weighted factor among other weighted factors, such as location within a coverage area, received signal strength, power levels/mode, and/or the like. For example, a wireless device experiencing packet loss above a packet loss threshold on a 5 GHz connection may determine to switch to a lower bandwidth 2.4 GHz connection on the same access point (e.g., if the connection is expected to be more reliable, and thereby improve network service).

Table 1 shows an example scenario in which a number of access points may be available to a wireless device that has both a 2.4 GHz radio and a 5 GHz radio. The scenario comprises four access points AP 1, AP 2, AP 3, and AP 4. The four access points may each comprise two radios. Each of the radios may be associated with a different network (e.g., identified by different service set identifiers). The wireless device may be currently connected via the 5 GHz radio to the AP 4 on network E. The wireless device may operate the 2.4 GHz radio to scan for 2.4 GHz networks (e.g., while connected via the 5 GHz radio). The scan may detect several 2.4 GHz networks, such as network A, network B, and network C on APs 1, 2, and 3, respectively. Data sent via a 2.4 GHz radio of AP 1 that is detected during the scan may comprise information about network D (5 GHz). The wireless device may not have directly detected network D by scanning, nor has the wireless device connected to network D previously. The wireless device may only detect network D because of the information sent via a 2.4 GHz radio of the AP 1. The AP 3 may send (e.g., via a beacon) information about channels used by the AP 3. The AP 1 may send information (e.g., via a beacon) about channels used by AP 1 and about a channel used by a different access point.

TABLE 1

| AP | Frequency | Network SSID | PHY rate | Network Information |
|---|---|---|---|---|
| 1 | 2.4 | A | 20 Mbps | A, D |
| 2 | 2.4 | B | 90 Mbps | B |
| 3 | 2.4 | C | 170 Mbps | C, D |
| 3 | 5 | D | 230 Mbps | C, D |
| 4 | 5 | E | 420 Mbps | E |

The information sent (e.g., in a beacon, message) via network D (e.g., using 5 GHz radio) may comprise, for example: estimated physical data rates available, e.g., based on an RSSI; channel width; special stream information; and mu-MIMO support, among others. The 2.4 GHz network's PHY rate may be estimated, or directly measured by connecting to the network depending on how much time is available for scanning.

An access point may send (e.g., broadcast) data (e.g., beacons, messages) at multiple frequencies, multiple bit rates, via multiple channels, and/or the like. Rather than sending data via only the lowest available bit rate, for example, one or more rates could be used for transmission. The wireless device may determine the quality of a potential connection that may be available based on which of the one or more rates are successful in communication with an access point. This approach may be used in addition to or as an alternative to inferring the probable quality of a potential connection based on a received signal strength of data received via a single bit rate (e.g., lowest bit rate).

The wireless device may store the information shown in Table 1. The wireless device may respond to changing network conditions by selecting an alternative network connection (e.g., a different radio, SSID, access point) from the stored information. The wireless device may detect a loss of connectivity to a network, high packet loss (e.g., due to interference), and/or other condition indicating that a threshold or criteria is met. The wireless device may determine a target network to communicate with based on the stored information.

The wireless device may connect directly to the target network. Connection to the target network may also be achieved by using an intermediate network before connecting to the target network. For example, referring again to Table 1, the wireless device may disconnect a first client radio from network E (5 GHz) to connect to network D (5 GHz). The wireless device may connect a second client radio to network C (2.4 GHz). The wireless device may disconnect from network E (5 GHz) in response to connecting to network C (2.4 GHz). In response to connecting to network C (2.4 GHz), the wireless device may disconnect the second radio (e.g., 5 GHz radio) from network E (5 GHz). In response to disconnecting the second client radio, the wireless device may connect via the second client radio with network D (5 GHz).

The second client radio may operate as a radio to alternate between scanning and connecting to a network. In this scenario, scanning may be performed less frequently than when the radio is dedicated to scanning only. This approach may be used for link aggregation, fast failover, or sending traffic via multiple connections (e.g., networks) simultaneously for higher reliability.

Figure 4:
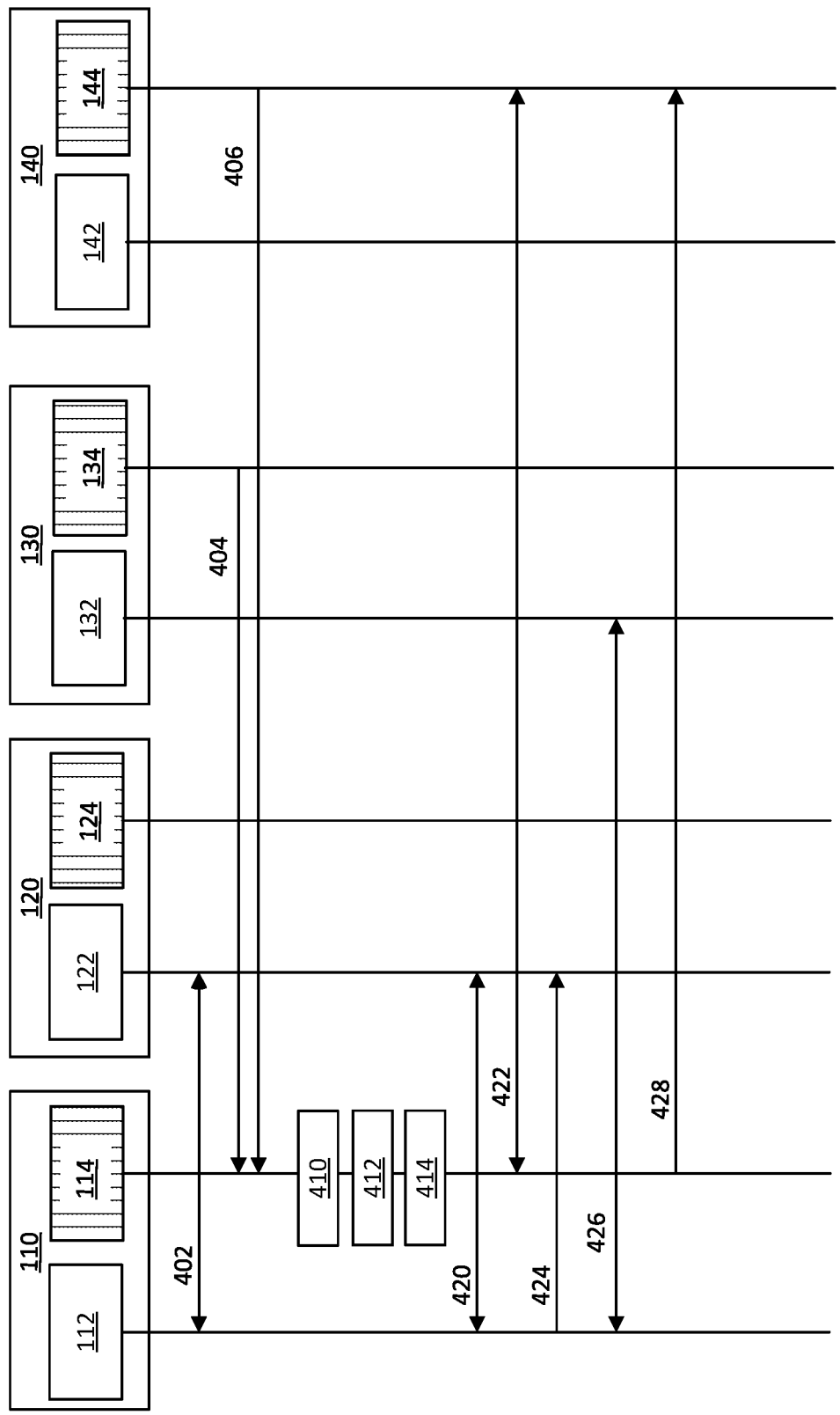
FIG. 4 is a diagram of an example sequence for accessing a network.

FIG. 4 is a diagram showing an example sequence. The sequence may involve a wireless device 110, a first access point 120, a second access point 130, and a third access point 140. The wireless device 110 and the access points 120, 130, and 140 each may comprise one or more radios, such as a first radio 112 of the wireless device 110, a second radio 114 of the wireless device 110, a first AP radio 122 of the first access point 120, a second AP radio 124 of the first access point 120, a third AP radio 132 of the second access point 130, a fourth AP radio 134 of the second access point 130, a fifth AP radio 142 of the third access point 140, and a sixth AP radio 144 of the third access point 140. Radios 112, 122, 132, and 142 may operate on a first band and/or channel. Radios 114, 124, 134, and 144 may operate on a second band and/or channel (e.g., separate from the first band and/or channel).

In step 402, the first radio 112 of the wireless device 110 may be connected to the first AP radio 122 of the first access point 120. In steps 404 and 406, the second radio 114 of the wireless device 110 may receive (e.g., by scanning, monitoring, probing) data (e.g., beacons, messages other signals) from the fourth AP radio 134 and the sixth AP radio 144 of the access points 130 and 140, respectively.

In step 410, the wireless device 110 may create a map (e.g., a table, a database, a data store) of access point and radio information. The access point and radio information may comprise available access points and radios. The access point and radio information may comprise information determined (e.g., extracted) from the received data (e.g., beacons) and/or other sources.

In step 412, the wireless device 110 may make a determination to switch from using the first access point 120 to using the second access point 130. The determination may be based on, for example, reaching a first performance threshold in the connection to the first access point 120. The determination may be based on the expectation of performance improvement reaching above a second threshold. The determination may be based on information of the locations of access points, the position and/or vector of the wireless device 110, and/or the like (e.g., via prior observations, information extracted or derived from beacons, or location or motion sensors in the wireless device 110).

In step 414, the wireless device 110 may determine to operate the second radio 114 to connect to the sixth AP radio 144. The connection may be made to continue service while changing the connection of the first radio 112 from the first access point 120 to the second access point 130. Such a determination may be based on thresholds, extracted or derived data, position or vector data, and/or the like In step 420, the wireless device 110 may use a current connection to the first AP radio 122 of the first access point 120 to negotiate credentials for a new connection. For example, the wireless device 110 may utilize IEEE 802.11.r protocols to transition to a new connection. The wireless device may be connected to the first access point 120. In Step 420, authentication messages may be exchanged between the wireless device 110 and the third access point 140. The authentication messages may be relayed via the first access point 120. It should be understood that communications between the first access point 120 and the third access point 140 are not shown in FIG. 4, and may be achieved through a communications network, not shown, e.g., a wired and/or wireless network that connects one or more of the access points. In response to the wireless device 110 being authenticated with the third access point 140 (e.g., via the first access point 120), the wireless device 110 may communicate with the third access point 140. For example, a re-association message may be sent directly to the sixth AP radio 144 of the third access point 140.

In step 422, the wireless device 110 may operate the second radio 114 to establish a connection to the sixth AP radio 144 of the third access point 140. In response to completing the second radio connection, the wireless device 110 may send a de-authorization message, in step 424, via the first radio 112 to the first AP radio 122 of the first access point 120. In step 426, the wireless device 110 may establish a connection via the first radio 112 to the third AP radio 132 of the second access point 130. By connecting to the third access point 140, the wireless device 110 may continue connectivity to at least one access point during the transition. Once the transition is complete, in step 428 the wireless device 110 may send a de-authorization message from the second radio 114 to the sixth AP radio 144 of the third access point 140.

Figure 5:
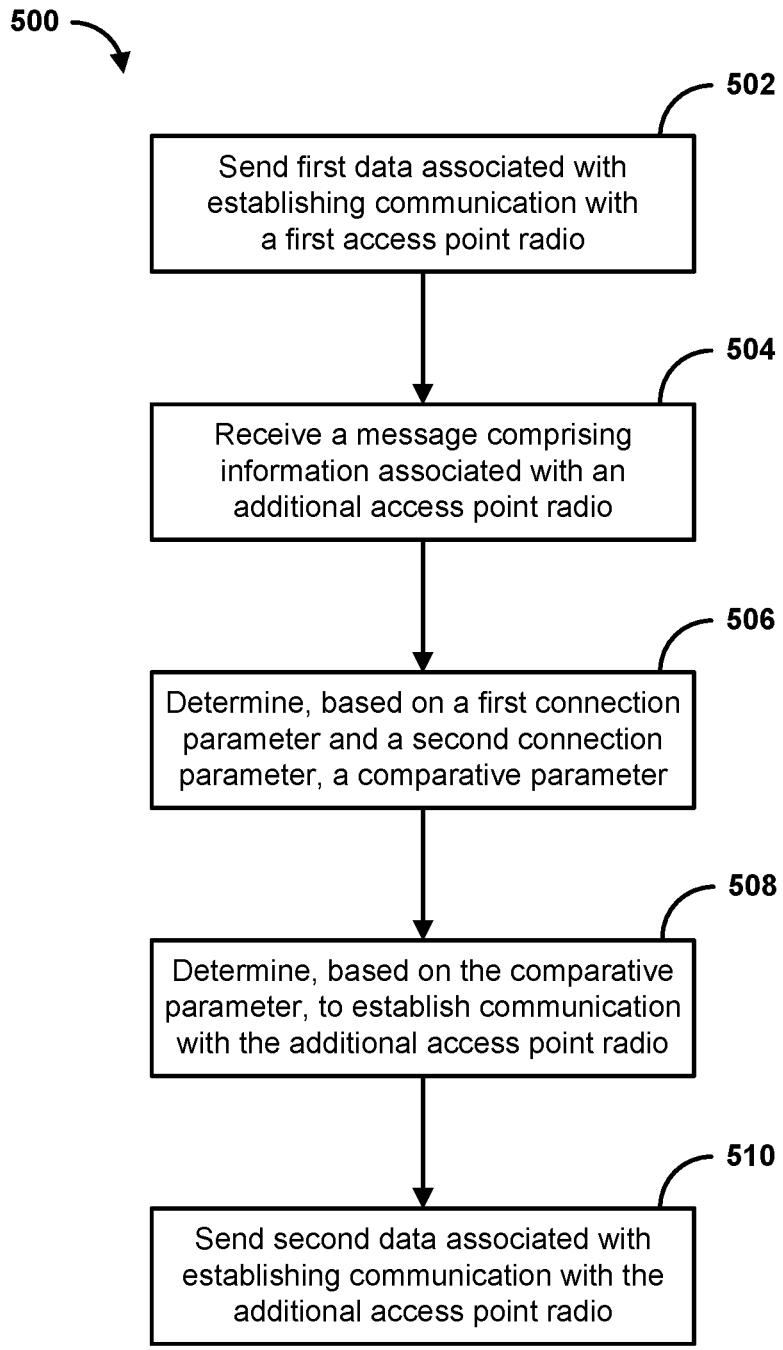
FIG. 5 is a flowchart of an example method.

FIG. 5 is a flowchart showing an example method 500 for communication. At step 502, first data (e.g., first communication data) associated with establishing communication with a first access point (AP) radio may be sent (e.g., transmitted). The first data may be sent by a first device. The first data may be sent by a first client radio. Communication between the first client radio and the first AP radio may be established.

The first device may comprise the first client radio. The first device may comprise a second client radio. The first device may comprise a wireless device, a mobile device, a laptop, a smart device (e.g., a smart phone, a smart watch, a smart wearable device), a tablet device, an onboard device, a combination thereof, and/or the like. The first client radio may be configured to communicate via a first channel of a communication band. The second client radio may be configured to communicate via a second channel of the communication band. The first client radio may be configured to communicate via a first communications band. The second client radio may be configured to communicate in a second communication band. The second communication band may be different from the first communication band.

The first AP radio may be comprised in a first access point. A second AP radio may be comprised in a second access point. A third AP radio may be comprised in the first access point or the second access point. The first AP radio may be configured to communicate via the first channel of the communication band. The first AP radio may be configured to communicate via the first communication band. The second AP radio may be configured to communicate via the second channel of the communication band. The second AP radio may be configured to communicate via the second communication band. The third AP radio may be configured to communicate via the first channel or the second channel of the communication band. The third AP radio may be configured to communicate via the first communication band or the second communication band. In some scenarios, the second AP radio may be comprised in the first access point.

At step 504, a message comprising information associated with an additional AP radio may be received. The additional AP radio may comprise the second AP radio or the third AP radio. The message may be received by the first device. The message may be received from the second AP radio and/or the third AP radio. The message may be received via the first client radio and/or the second client radio.

The message may be received in a wireless beacon. The wireless beacon may be advertising the first AP radio, the second AP radio, the third AP radio, and/or a combination thereof. The message may comprise at least one of a service set identifier of the first AP radio, the second AP radio, the third AP radio, and/or a combination thereof. The message may comprise a location of an access point associated with the first AP radio, the second AP radio, the third AP radio, and/or a combination thereof. The message may comprise a communication range of the first AP radio, the second AP radio, the third AP radio, and/or a combination thereof. The message may comprise a transmission rate of the first AP radio, the second AP radio, the third AP radio, and/or a combination thereof. The message may comprise a packet loss rate of the first AP radio, the second AP radio, the third AP radio, and/or a combination thereof.

The information associated with the additional AP radio may be stored (e.g., by the first device) in a list of AP radios of one or more access points radio. The list of AP radios may be based on scanning, by the first device, for the one or more access points. The list of AP radios may comprise AP radios detected directly (e.g., direct communication) or indirectly. The scanning may comprise receiving a message (e.g., beacon) from the one or more access points. An example message may comprise information associated with an AP radio sending the message. The message may comprise information associated with an AP radio that did not send the message. For example, an access point may detect or otherwise determine other access points and/or AP radios and store information associated with the other access points and/or AP radios. The information associated with the other access points and/or AP radios may be part of the message (e.g., a beacon broadcast).

In some implementations, a current state of the first device may be determined. The current state may comprise one or more of location information or connection information. The location information may comprise a distance from the first device to the first AP radio. The connection information may comprise one or more of a packet loss or a connection bit rate. The current state of the first device may comprise and/or be based on global positioning data by a sensor in the first device, directional beam information associated with a beam-forming access point, signal strength information associated with signals from one or more access points, a combination thereof, and/or the like. The current state may comprise a vector of motion of the first device. The vector of motion may comprise a velocity, an acceleration, a distance, and/or the like for one or more directions. The vector of motion may be determined based on a change in location information (e.g., change from one GPS coordinate to another). The vector of motion may be determined based on one or more accelerometer values.

At step 506, a comparative parameter (e.g., a result, a metric, a comparative result, a comparative metric) may be determined. The comparative parameter may be determined based on a first connection parameter and a second connection parameter. The comparative parameter may comprise and/or be indicative of a comparison of the first connection parameter and the second connection parameter. The comparative parameter may comprise and/or be indicative of a difference between the first connection parameter and the second connection parameter. The comparative parameter may be determine based on any appropriate calculation, such as subtraction, division, addition, multiplication, applying a formula. The comparative parameter may comprise the result of a logical determination. The first connection parameter may be associated with the first AP radio. The second connection parameter may be associated with the additional AP radio, such as the second AP radio or the third AP radio.

The first connection parameter may comprise an expected communications range, a location of the first AP radio, an estimated available data bandwidth, an estimated available physical data transmission rate, an estimated packet loss rate, multiple-in-multiple-out beam information, a combination thereof, and/or the like. The second connection parameter may comprise an expected communications range, a location of the third AP radio, an estimated available data bandwidth, an estimated available physical data transmission rate, an estimated packet loss rate, multiple-in-multiple-out beam information, a combination thereof, and/or the like.

At step 508, it may be determined to establish communication with the additional AP radio. It may be determined to switch to communicating with the additional AP radio. The determination may be based on the difference between the first connection parameter and the second connection parameter. The determination may be based on the difference satisfying the threshold. If the difference satisfies (e.g., is above, or in some implementations, is below) the threshold, then it may be determined to establish communication with the second AP radio. The threshold may comprise a signal strength, a packet loss, a communication range (e.g., communication range of an AP radio), a data bandwidth (e.g., data bandwidth of an AP radio), a combination thereof, and/or the like.

The threshold may comprise a dynamic threshold that has a value that changes based on one or more conditions. In some implementations, a threshold may be determined (e.g., by the first device). The threshold may be determined based on the current state of the first device. Determining the threshold may comprise determining a value of the threshold based on a distance of the first device from the first AP radio. The value of the threshold may decrease as the distance increases. Determining the threshold may comprise determining a value of the threshold based on a packet loss of the communication between the first device and the first AP radio. The value of the threshold may decrease as the packet loss increases.

At step 510, second data (e.g., second communication data) associated with establishing communication with the additional AP radio (e.g., the second AP radio, the third AP radio) may be sent (e.g., transmitted). The second data may be sent by the second client radio. Communication between a second client radio and the additional AP radio (e.g., second AP radio, the third AP radio) may be established. The second data associated with establishing communication with the additional AP radio (e.g., the second AP radio, the third AP radio) may be sent in response to determining to establish communication with the additional AP radio. Sending the second data may comprise sending a re-association message to the additional AP radio.

The first device may be disconnected from the first AP radio in response to determining to establish communication with the third AP radio. Disconnecting from the first AP radio may be performed in response to sending the second data (e.g., or otherwise establishing communication between the second client radio and the additional AP radio).

Figure 6:
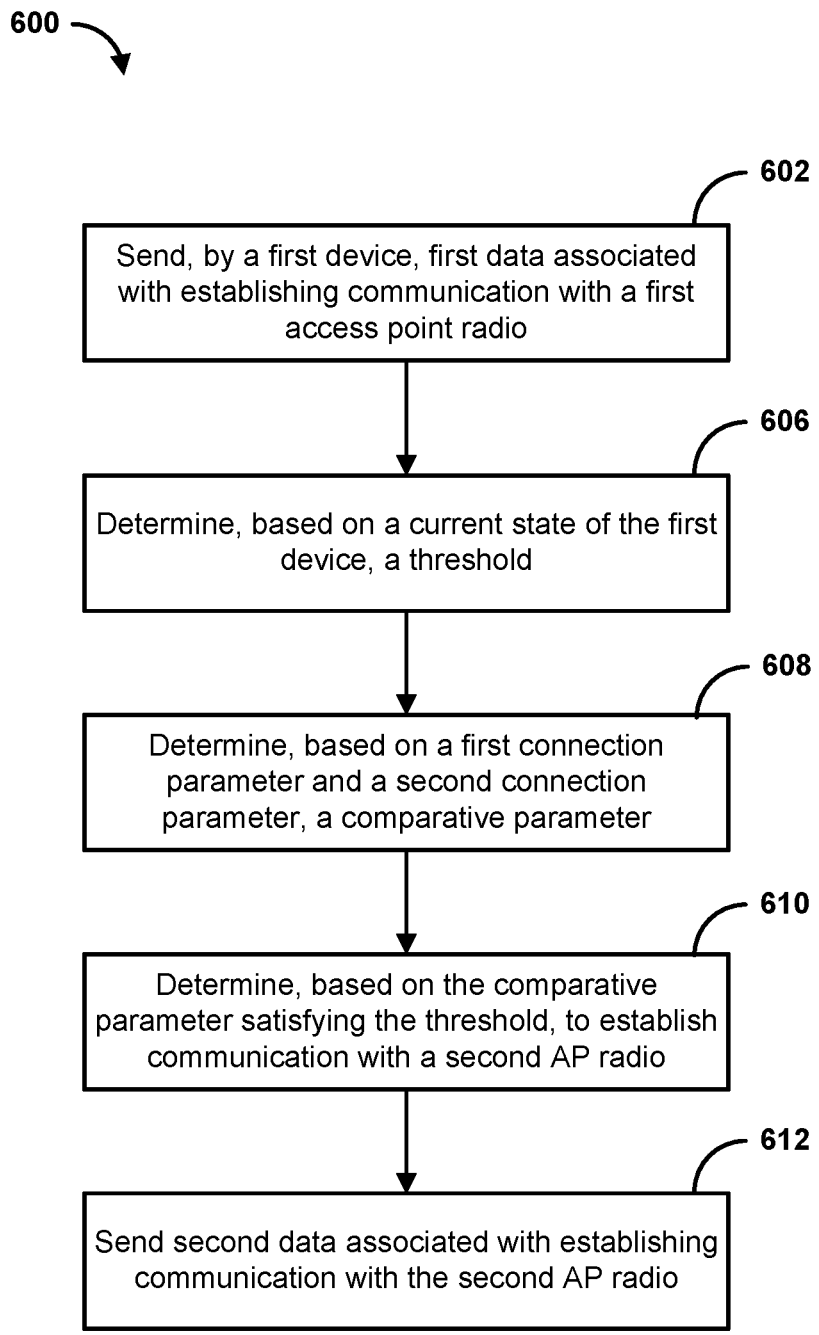
FIG. 6 is a flowchart of another example method.

FIG. 6 is a flowchart showing an example method 600 for communication. At step 602, first data (e.g., first communication data) associated with establishing communication with the first AP radio may be sent (e.g., transmitted). The first data may be sent by a first device. The first data may be sent by a first client radio. The first data may be sent to a first access point (AP) radio. Communication between the first client radio and the first AP radio may be established. The first device may comprise a wireless device, a mobile device, a laptop, a smart device (e.g., a smart phone, a smart watch, a smart wearable device), a tablet device, an onboard device, a combination thereof, and/or the like.

The first device may comprise the first client radio. The first client radio may be configured to communicate via a first channel of a communication band. The first device may comprise a second client radio. The second client radio may be configured to communicate via a second channel of the communication band. The first client radio may be configured to communicate via a first communication band. The second client radio may be configured to communicate in a second communication band. The second communication band may be different from the first communication band.

A current state may be determined. The current state may comprise a current state of the first device. The current state may comprise a current state of the first client radio and/or the second client radio. The current state may comprise one or more of location information or connection information. The location information may comprise a distance from the first device to the first AP radio. The location information may comprise a distance from the first device to a second AP radio. The first AP radio may be comprised in a first access point. The second AP radio may be comprised in the first access point or a second access point. The connection information may comprise one or more of a packet loss or a connection bit rate.

The current state of the first device may comprise and/or be based on global positioning data of a sensor in the first device, directional beam information associated with a beam-forming access point, signal strength information associated with signals from one or more access points, a combination thereof, and/or the like.

The current state may comprise a vector of motion of the first device. The vector of motion may comprise a velocity, an acceleration, a distance, and/or the like for one or more directions. The vector of motion may be determined based on a change in location information (e.g., change from one GPS coordinate to another). The vector of motion may be determined based on one or more accelerometer values.

At step 604, a threshold may be determined. The threshold may be determined based on the current state of the first device. A value of the threshold may vary based on the current state of the first device. Determining the threshold may comprise determining a value of the threshold based on a distance of the first device from the first AP radio (e.g., or a distance from the second AP radio). The value of the threshold may vary based on a location of the first device. The value of the threshold may decrease as the distance increases. The value of the threshold may vary based on communication information of the first device. Determining the threshold may comprise determining a value of the threshold based on a packet loss of the communication between the first device and the first AP radio. The value of the threshold may decrease as the packet loss increases. The threshold may be determined based on a connection bit rate (e.g., between the first client radio and the first AP radio). The threshold may comprise a signal strength, a packet loss, a communication range (e.g., communication range of an AP radio), a data bandwidth (e.g., data bandwidth of an AP radio), a combination thereof (e.g., a weighted combination), and/or the like.

At step 606, a comparative parameter (e.g., a result, a metric, a comparative result, a comparative metric) may be determined. The comparative parameter may be determined based on a first connection parameter and a second connection parameter. The first connection parameter may be associated with the first AP radio. The second connection parameter may be associated with the second AP radio. The comparative parameter may comprise and/or be indicative of a comparison of the first connection parameter and the second connection parameter. The comparative parameter may comprise and/or be indicative of a difference between the first connection parameter and the second connection parameter. The first connection parameter may comprise an expected communication range, a location of the first AP radio, an estimated available data bandwidth, an estimated available physical data transmission rate, an estimated packet loss rate, multiple-in-multiple-out beam information, a combination thereof, and/or the like. The second connection parameter may comprise an expected communication range, a location of the second AP radio, an estimated available data bandwidth, an estimated available physical data transmission rate, an estimated packet loss rate, multiple-in-multiple-out beam information, a combination thereof, and/or the like.

The first device may determine, based on a list of AP radios of one or more access points, the second AP radio. The list of AP radios may be based on scanning, by the first device, for the one or more access points. The list of AP radios may comprise AP radios detected directly (e.g., direct communication) or indirectly. The scanning may comprise receiving a message (e.g., beacon) from the one or more access points. An example message may comprise information associated with an AP radio sending the message. The message may comprise information associated with an AP radio that did not send the message. For example, an access point may detect or otherwise determine other access points and/or AP radios and store information associated with the other access points and/or AP radios. The information associated with the other access points and/or AP radios may be part of the message (e.g., a beacon broadcast).

At step 608, a determination may be made to establish communication with the second AP radio. The determination may be to switch to the second AP radio (e.g., from the first AP radio). The determination may be made based on the difference satisfying the threshold. If the difference satisfies (e.g., is above, or in some implementations, is below) the threshold, then it may be determined to switch to the second AP radio.

At step 610, second data (e.g., second communication data) associated with establishing communication with the second AP radio may be sent (e.g., transmitted). The second data may be sent by the first device. The second data may be sent by the second client radio (e.g., or first client radio). The second data may be sent to the second AP radio. Communication may be established between the second client radio (e.g., or the first client radio) and the second AP radio. The communication may be established by the first device. The second data may be sent in response to determining to establish communication with the second AP radio. Sending the second data may comprise sending a re-association message to the second AP radio.

The first device may disconnect from the first AP radio in response to determining to establish communication with the second AP radio. Disconnecting from the first AP radio may be performed in response to the sending of the second data to the second AP radio (e.g., or establishing communication between the second client radio and the second AP radio).

Figure 7:
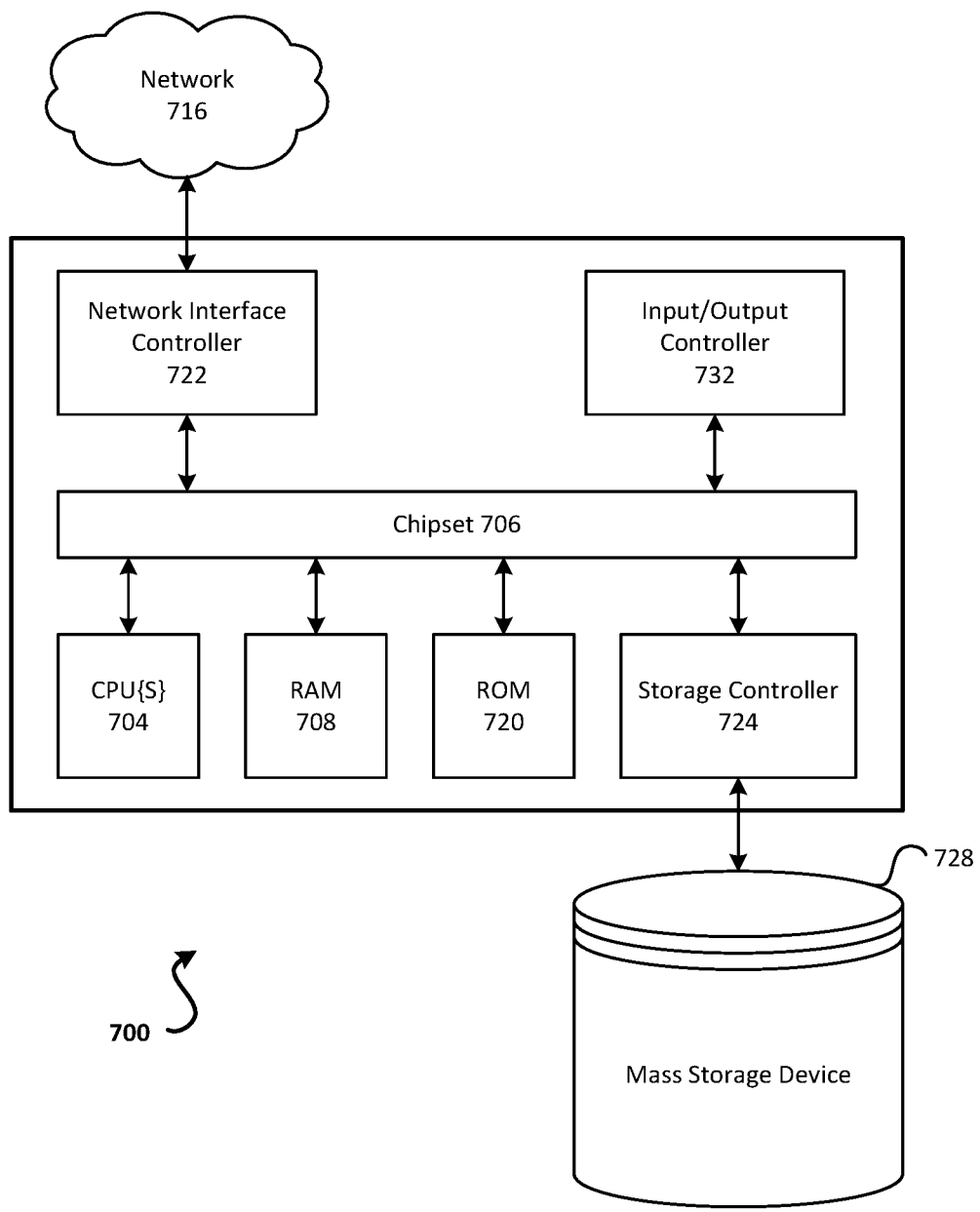
FIG. 7 shows a block diagram of an example computing device.

FIG. 7 shows a computing device that may be used in various aspects, such as the network routers, servers, access points, and wireless devices depicted in FIG. 1-FIG. 4. Such devices, including their first and second radios may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 1-FIG. 6.

The computing device 700 may comprise a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally comprise electronic circuits that store one of two binary states, such as flip-flops, and electronic circuits that provide an output state based on the logical combination of the states of one or more other switching elements, such as logic gates. These basic switching elements may be combined to create more complex logic circuits comprising registers, adders-subtractors, arithmetic logic units, floating-point units, and the like.

The CPU(s) 704 may be augmented with or replaced by other processing units, such as the GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may provide an interface to a computer-readable storage medium, such as a read-only memory (ROM) 720 or non-volatile RAM (NVRAM) (not shown), for storing basic routines that may help to start up the computing device 700 and to transfer information between the various components and devices. The ROM 720 or NVRAM may also store other software components necessary for the operation of the computing device 700 in accordance with the aspects described herein.

The computing device 700 may operate in a networked environment using logical connections to remote computing nodes and computer systems through a local area network (LAN) 716. The chipset 706 may comprise functionality for providing network connectivity through a network interface controller (NIC) 722, such as a gigabit Ethernet adapter. A NIC 722 may be capable of connecting the computing device 700 to other computing nodes over the network 716. It should be appreciated that multiple NICs such as the NIC 722 may be present in the computing device 700, connecting the computing device to other types of networks and remote computer systems. The NIC 722 may incorporate a number of radios which are capable of being used simultaneously in a different bands, channels, or spectrums, thus allowing computing device 700 to connect to multiple access points, or alternatively, to be connected in one band while scanning in another band, for example.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may comprise, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

The computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may comprise volatile and non-volatile, transitory computer-readable storage media and non-transitory computer-readable storage media, and removable and non-removable media implemented in any method or technology. Computer-readable storage media comprises RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to some aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described above. The computing device 700 may have access to computer-readable storage media storing computer-executable instructions, which, when executed by the computing device 700, may perform the methods described herein, such as in FIG. 1-FIG. 6.

A computing device, such as the computing device 700 depicted in FIG. 7, may also comprise an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not comprise all of the components shown in FIG. 7, may comprise other components that are not explicitly shown in FIG. 7, or may utilize an architecture completely different than that shown in FIG. 7.

As described herein, a computing device may be a physical computing device, such as the computing device 700 of FIG. 7. A computing node may also comprise a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment comprises from the one particular value and/or to the other particular value. Similarly, when values are expressed as approximations, by use of the antecedent "about," it will be understood that the particular value forms another embodiment. It will be understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. The methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture comprising computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. Alternatively or additional, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are shown as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. In some embodiments, some or all of the systems and/or modules may be implemented or provided in other ways, such as at least partially in firmware and/or hardware, comprising, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method comprising:
sending, by a first client radio of a first device and to a first access point (AP) radio of a first access point, first communication data associated with establishing communication with the first AP radio;
receiving, by the first device and from the first access point, a message comprising information associated with a second AP radio of a second access point;
determining, by the first device and based on a first connection parameter associated with the first AP radio and a second connection parameter associated with the second AP radio, a comparative parameter;
determining, by the first device and based on the comparative parameter satisfying a threshold, to establish communication with the second AP radio; and
sending, by a second client radio of the first device and to the second AP radio, second communication data associated with establishing communication with the second AP radio.

2. The method of claim 1, wherein receiving the message comprises receiving the message via the second client radio.

3. The method of claim 1, further comprising:
determining a current state of the first device; and
determining, based on the current state of the first device, the threshold.

4. The method of claim 3, wherein the current state comprises one or more of data indicative of a distance from the first device to the first AP radio, a packet loss, or a connection bit rate.

5. The method of claim 1, wherein the message is received in a wireless beacon advertising a third AP radio of the first access point.

6. The method of claim 1, further comprising determining a vector of motion of the first device, and wherein determining to establish communication with the second AP radio is based on the vector of motion of the first device.

7. The method of claim 1, wherein a value of the threshold varies based on a current state of the first device.

8. A device comprising:
one or more processors; and
memory storing instructions that, when executed by the one or more processors, cause the device to:
send, by a first client radio of the device and to a first access point (AP) radio of a first access point, first communication data associated with establishing communication with the first AP radio;
receive, from the first access point, a message comprising information associated with a second AP radio of a second access point;

determine, based on a first connection parameter associated with the first AP radio and a second connection parameter associated with the second AP radio, a comparative parameter;

determine, based on the comparative parameter satisfying a threshold, to establish communication with the second AP radio; and send, by a second client radio of the device and to the second AP radio, second communication data associated with establishing communication with the second AP radio.

9. The device of claim 8, wherein the instructions that, when executed by the one or more processors, cause the device to receive the message comprises instructions that, when executed by the one or more processors, cause the device to receive the message via the second client radio.

10. The device of claim 8, wherein the instructions, when executed by the one or more processors, further cause the device to:

determine a current state of the device; and determine, based on the current state of the device, the threshold.

11. The device of claim 10, wherein the current state comprises one or more of data indicative of a distance from the device to the first AP radio, a packet loss, or a connection bit rate.

12. The device of claim 8, wherein the message is received in a wireless beacon advertising a third AP radio of the first access point.

13. The device of claim 8, wherein the instructions, when executed by the one or more processors, further cause the device to determine a vector of motion of the device, and wherein the instructions that, when executed by the one or more processors, cause the device to determine to establish communication with the second AP radio comprises instructions that, when executed by the one or more processors, cause the device to determine to establish communication with the second AP radio based on the vector of motion of the device.

14. The device of claim 8, wherein a value of the threshold varies based on a current state of the device.

15. A system comprising:

a first access (AP) radio of a first access point;

a second AP radio of a second access point; and a first device comprising a first client radio and a second client radio, wherein the first device is configured to:

send, by the first client radio and to the first AP radio of the first access point, first communication data associated with establishing communication with the first AP radio;

receive, from the first access point, a message comprising information associated with the second AP radio of the second access point;

determine, based on a first connection parameter associated with the first AP radio and a second connection parameter associated with the second AP radio, a comparative parameter;

determine, based on the comparative parameter satisfying a threshold, to establish communication with the second AP radio; and send, by the second client radio and to the second AP radio, second communication data associated with establishing communication with the second AP radio.

16. The system of claim 15, wherein the first device is configured to receive the message by receiving the message via the second client radio.

17. The system of claim 15, wherein the first device is further configured to:

determine a current state of the first device; and determine, based on the current state of the first device, the threshold.

18. The system of claim 17, wherein the current state comprises one or more of data indicative of a distance from the first device to the first AP radio, a packet loss, or a connection bit rate.

19. The system of claim 15, wherein the message is received by the first device in a wireless beacon advertising a third AP radio of the first access point.

20. The system of claim 15, wherein the first device is configured to determine a vector of motion of the first device, and wherein the first device is configured to determine to establish communication with the second AP radio based on the vector of motion of the first device.

21. The system of claim 15, wherein the first device is configured to vary a value of the threshold based on a current state of the first device.

* * * * *